Aug. 8, 1967     T. H. PUTMAN     3,334,520

TEMPERATURE SENSING APPARATUS

Filed Oct. 12, 1964     2 Sheets-Sheet 1

WITNESSES
Theodore F. Wrobel
James F. Young

INVENTOR
Thomas H. Putman
BY *Brodahl*
ATTORNEY

Aug. 8, 1967    T. H. PUTMAN    3,334,520
TEMPERATURE SENSING APPARATUS
Filed Oct. 12, 1964    2 Sheets-Sheet 2
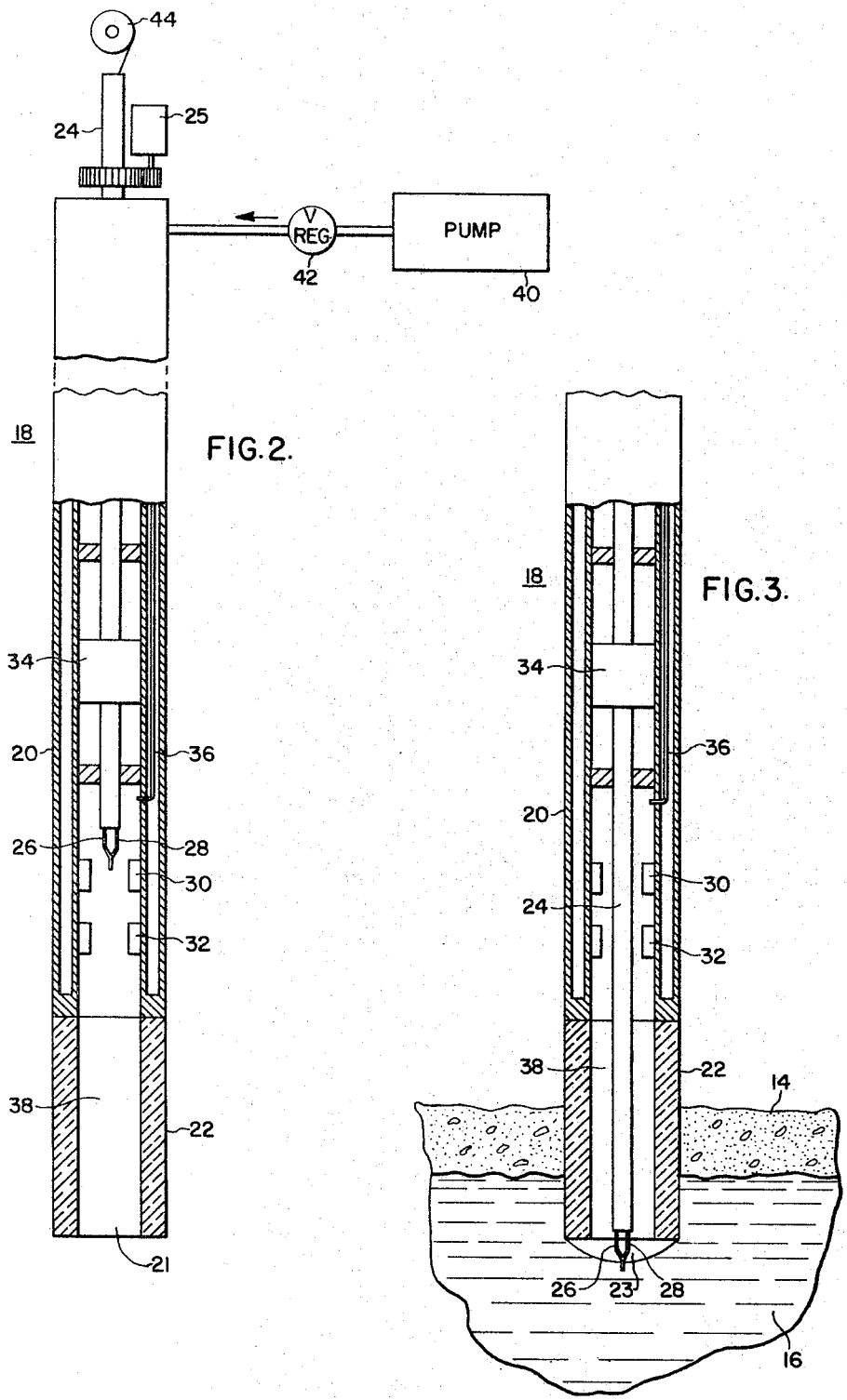

United States Patent Office 3,334,520
Patented Aug. 8, 1967

3,334,520
TEMPERATURE SENSING APPARATUS
Thomas H. Putman, Penn Hills Township, Pa., assignor to Westinghouse Electric Corporation, East Pittsburgh, Pa., a corporation of Pennsylvania
Filed Oct. 12, 1964, Ser. No. 403,134
7 Claims. (Cl. 73—359)

The present invention relates in general to temperature sensing apparatus, and more particularly to temperature sensing apparatus for sensing the temperature of the molten metal within an oxygen burning converter or furnace, such as is in present use for the making of steel, during the oxygen blow period.

In the oxygen steel making process the problem arises of measuring the temperature of the molten bath during the oxygen blow period. Because of the high temperature and intense heat and the relatively inaccessible nature of the furnace during the oxygen blow period, it has been very difficult to measure the actual temperature of the resultant molten metal during this operation. It has been found in practice that optical pyrometric means are not satisfactory because the surface of the iron bath cannot be suitably observed and standard immersion type thermocouples cannot be used because the interior of the vessel is inaccessible during the blow period.

It is an object of the present invention to provide an improved temperature sensing apparatus that is better suited to measure the relatively high temperature of the molten metal within a furnace.

It is a different object of this invention to provide improved temperature sensing or measuring apparatus operative with the molten metal present within a basic oxygen steel making furnace, which apparatus is better able to make successive or repeated temperature measurements at any desired time or times in the course of the furnace operation.

In accordance with the present invention a temperature sensing apparatus is provided including an elongated tubular member adapted to be positioned within the furnace and passed through the slag layer and into the molten metal within a basic oxygen steel making furnace, which tubular member has an open end made of ceramic material and a thermocouple junction making or effecting apparatus positioned within the tubular member such that the thermocouple junction is remade or again established after each measurement of the molten metal temperature.

Other objects and advantages of the present invention will become apparent when the following detailed specification is studied with reference to the following drawings in which:

FIG. 2 is a schematic showing of the temperature sensing apparatus in accordance with the present invention;

FIG. 3 is a schematic showing of the temperature sensing apparatus with the thermocouple in position to sense the molten metal temperature.

Figure 1:
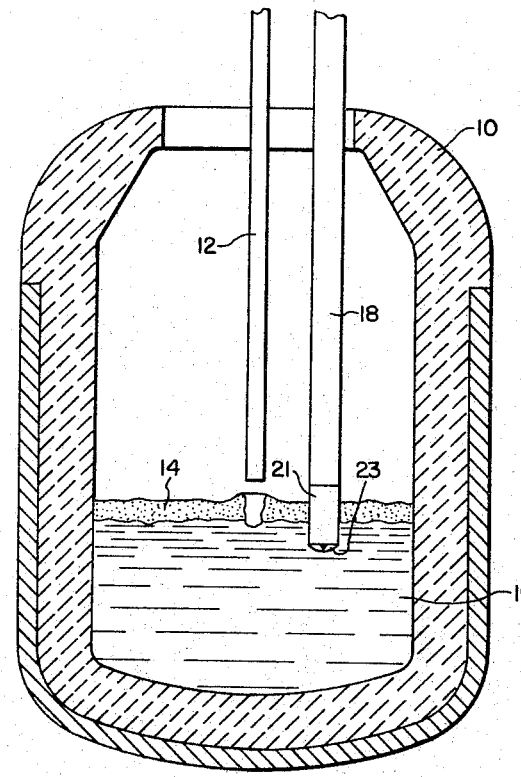
FIGURE 1 is a diagrammatic showing of a basic oxygen steel making furnace including the oxygen lance and the temperature sensing apparatus in accordance with the present invention.

Referring to FIG. 1 there is shown a well-known rapid oxygen steel making furnace vessel 10 which can include a steel shell and a refractor lining provided along the inner surface of the steel shell. Pig iron and scrap and other materials can be charged into the furnace vessel through the top opening, and the furnace is provided with suitable means for tilting such that the molten metal after refining can be poured from the furnace vessel through suitable provided tap holes not shown. A conventional water-cooled oxygen lance 12 is movable through the top opening of the furnace 10 and extends downwardly into the furnace as shown to terminate above the surface of a layer of slag 14 which overlies the molten metal 16.

Oxygen of high purity is blown through the lance 12 onto the surface of the slag 14 and the molten metal 16 to produce a generally cup-shaped cavity as shown beneath the lance 12. A turbulent action is produced in the metal 16, while the oxygen reacts with the various impurities in the steel to form oxides which pass off as gases or accumulate within the slag layer 14.

The temperature sensing apparatus 18 extends through the top opening of the furnace 10 and has an open end 21 which is pushed through the layer of slag 14 and becomes immersed in the molten metal 16 at a location away from the cavity below the lance 12 for the purpose of measuring the temperature of the molten metal.

With reference to FIGS. 2 and 3, there is shown in greater detail the temperature sensing apparatus 18 including an outside water-cooled tubular shell 20 having a ceramic tip portion 22 which is immersed in the molten metal bath 16 while the metal temperature is being sensed or measured. Inside the tubular shell 20 there is provided an inside rod member 24 which can be rotated or moved axially relative to the outside shell 20. The center core of the rod 24 is composed of an electrically insulating material and contains two holes which run parallel to the axis of the rod 24. The thermocouple wires 26 and 28 pass through the two parallel holes within the inside rod member 24. A wire clamping mechanism 30 is provided for remote actuation such that when closed the clamping mechanism 30 holds the thermocouple wires 26 and 28 together and when the clamping mechanism 30 is opened as shown it permits the inside rod 24 to pass through the illustrated clamping jaws of the clamping mechanism 30. An electric welding mechanism 32 is provided and remotely controlled to permit the welding of a thermocouple junction on the lower end of the respective thermocouple wires 26 and 28, and is retractable as shown to allow the passage of the inside rod 24 between the illustrated electrode members of the electric welding mechanism 32. A remotely controlled actuating mechanism 34 including an electric motor or the like is provided to effect the axial movement of the inside rod member 24 relative to the outside shell 20. A gas passage 36 is provided for pumping air or other inert gas to the bottom chamber 38 of the lance 18. A suitable gas pump 40 and pressure control orifice or valve 42 are connected to the passage 36 for supplying air or desired gas through the passage 36 into the chamber 38 when the temperature measuring member is immersed through the slag layer 14 and into the molten metal 16. A wire container reel 44 is operative with the inside rod member 24 for supplying the thermocouple wires 26 and 28 through the parallel holes along the axis of the inside rod member 24 for successive remaking of the thermocouple junction during the continued operation of the temperature sensing member as shown in FIGS. 2 and 3.

In the operation of the temperature sensing apparatus in accordance with the present invention and as shown in FIGS. 1, 2 and 3, there is first established a thermocouple junction between the wires 26 and 28 while the temperature sensing apparatus 18 is positioned away from the molten metal 16 and by operation of the electric welding mechanism 30 with the thermocouple wires 26 and 28 at this time extending a short distance from and below the lower end of the inside rod 24. The elongated tubular member 18 is then lowered into the furnace 10 with the gas pump 40 in operation and such that the member 18 passes through the slag layer 14 and extends into the metal bath 16 with the open end 21 extending into the metal bath 16. The gas pressure within the chamber 38 is now sufficient to make sure the slag has blown away to leave the molten metal exposed and that there is a reasonable head of molten metal on the outside of the ceramic tip 22 with a small cavity 23 formed in the molten metal 16. While the temperature sensing member 18 is lowered, the gas flow through the passage 36 into the chamber 38 is chosen to be sufficient to clear away all slag from the slag layer 14 which would otherwise rise on the inside of the ceramic tip 22. The molten metal level relative to the ceramic tip 22 is now substantially even with the open end 21. The inside rod 24 is now lowered through operation of a suitable motor mechanism 34 or the like operative, with a rack and pinion or hydraulic cylinder as may be desired, with the inside rod being automatically lowered until the thermocouple comes in contact with the molten metal bath as shown in FIG. 3 at which time a temperature measurement signal is provided through the thermocouple wires 26 and 28 and can be sensed to indicate the temperature of the molten metal bath and can be utilized to stop the operation of the motor mechanism 34 moving the inside rod 24.

When the so provided temperature signal discontinues due to the destruction of the thermocouple junction by the extremely high temperature, in the order of 2700 to 3000 degrees Fahrenheit, of the molten metal bath 16, the motor mechanism 34 operative with the inside rod member 24 is caused to withdraw the rod member 24 to its position away from the molten metal and slag layer as shown in FIG. 2 and prepare for remaking the thermocouple junction. The temperature sensing member 18 can be raised outside the furnace 10 or to a position above the slag layer. The clamping mechanism 30 holds the thermocouple wires 26 and 28 during a predetermined portion of the movement of the inside rod 24 such that when the inside rod 24 is still further retracted this will accomplish pulling additional thermocouple wire out of the lower end of the inside rod member 24 from the holding reel 44. Next the inside rod 24 is rotated two or three revolutions by the motor 25 to accomplish the twisting of the thermocouple wires 26 and 28 together within the clamping mechanism 30. Upon release of the clamping mechanism 30 the inside rod 24 is now lowered until the lower ends of the twisted thermocouple wires enter the welding mechanism 32 which then welds the junction for the next temperature measurement. The inside rod 24 is now retracted to the position shown in FIG. 2 and the temperature sensing member 18 is now ready for immersion into the metal 16 as shown in FIG. 3 and the taking of a second temperature measurement of the molten metal bath 16 within the furnace 10.

Figure 4:
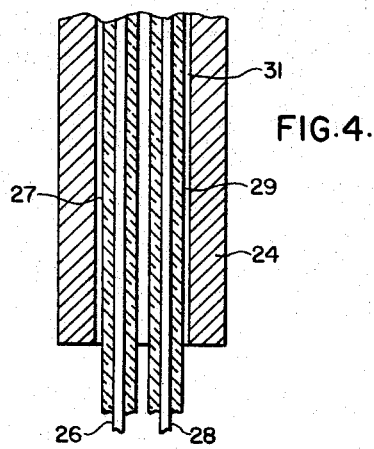
FIG. 4 shows a modified form of this invention.

There is shown in FIG. 4, as a modification of the present invention for applications where a thermocouple junction as such is not required, two wires 26 and 28 forming the couple and which can be fed into the molten metal bath 16 in a continuous manner from a suitable container reel or the like at a rate determined by the dissolving of the wires by the metal bath 16. A satisfactory temperature signal will be obtained in this manner provided the individual wires are suitably insulated, for example within respective glass tubes 27 and 29 or within flexible fiber glass casings. The glass tubes 27 and 29 would enable the wires 26 and 28 to penetrate the molten metal bath surface adequately to provide the desired temperature signal before the couple dissolves. Without the glass tube or fiber glass protective casing for the wires, the wires would melt before an adequate penetration of the molten metal surface were effected. If desired, only one hole 31 within the rod 24 is provided for the insulated wires 26 and 28, which are either fed continuously through that hole into the molten metal from a position as shown in FIG. 3 or periodically fed through that hole and entered into the molten metal to make a temperature reading and then be moved into the position shown in FIG. 2 for preparation to again be lowered to the position as shown in FIG. 3.

While there has been shown and described what is at present considered to be the preferred embodiment of the invention, modification thereto will readily occur to those skilled in this art. It is not desired therefore, that the invention be limited to the specific arrangement shown and described, but it is to be understood that all equivalents, alterations, and modifications within the spirit and scope of the present invention are herein meant to be included.

I claim as my invention:

1. In apparatus for sensing the temperature of the molten metal within an oxygen converter furnace during the oxygen blow period of that furnace, an elongated tubular member having an open end made of ceramic material, means connected with said member to move the tubular member such that the open end is immersed in the molten metal and then removed from the molten metal, means for pressurizing the interior of said member to prevent the molten metal from entering therein when the open end is immersed in the molten metal, temperature sensing means including a first temperature responsive element positioned within the tubular member and adapted to contact the molten metal for providing a temperature signal in accordance wtih the temperature of the molten metal prior to said element becoming incapacitated for providing said temperature signal, with said temperature sensing means including temperature responsive element rebuilding means to provide a second temperature responsive element to provide another temperature signal.

2. In apparatus for sensing the temperature of the molten metal in a furnace, an elongated hollow member having an open end, means operative with said member to move the member such that the open end dips into the molten metal and then is removed from the molten metal, means operative with said member to prevent the molten metal from entering into said member when the open end is immersed in the molten metal, temperature sensing means including a first temperature responsive device positioned within the hollow member and movable into contact with the molten metal for providing a first temperature signal indicative of the temperature of the molten metal prior to said temperature sensing means becoming incapacitated for that purpose, with said temperature sensing means including temperature responsive device rebuilding means operative when said open end is removed from the molten metal to provide a second temperature responsive device to thereby again become capacitated to provide a second temperature signal.

3. In apparatus for sensing the temperature of the molten metal during the oxygen blow period of an oxygen burning furnace, an elongated tubular member having an open end, means connected with said member to move the tubular member axially such that the open end is immersed in the molten metal and then removed from the molten metal, means to prevent the molten metal from entering into said member when the open end is immersed in the molten metal, temperature sensing means including a thermocouple element operative with the tubular member and adapted to be moved into contact with the molten metal for providing a temperature indicative signal in accordance with the temperature of the molten metal prior to said thermocouple element becoming incapacitated for that purpose, and thermocouple element rebuilding means within the tubular member of said temperature sensing means being able when the open end of said temperature sensing means is removed from the molten metal to rebuild another thermocouple element to provide another temperature signal.

4. In apparatus for sensing the temperature of the molten metal within a furnace during the oxygen blow period of that furnace, an elongated tubular member having an open end, means connected with said member to move the tubular member such that the open end is immersed in the molten metal and then removed from the molten metal, means for pressurizing the interior of said member to prevent the molten metal from entering therein when the open end is immersed in the molten metal, temperature sensing means including a first thermocouple junction made up of two metal wires and positioned within the tubular member and adapted to be moved into contact with the molten metal for providing a first temperature signal in accordance with the temperature of the molten metal and then becoming inoperative for that purpose, with said temperature sensing means including wire connecting means capable when said open end is removed from the molten metal to establish a second thermocouple junction for providing a second temperature signal when the latter junction is moved into contact with the molten metal.

5. Apparatus for measuring the temperature of molten metal comprising an elongated tubular member having an open end, said tubular member being movable between a first position where said open end is immersed in the molten metal and a second position where said open end is not immersed in the molten metal, means for preventing the molten metal from entering within the tubular member when the latter member is in said first position, temperature measuring means including a thermocouple junction positioned within said member and operative to provide a control signal in accordance with the temperature of the molten metal when said member is in the first position, and junction forming means operative with said temperature measuring means when said member is in the second position to make a thermocouple junction.

6. Apparatus for measuring the temperature of molten metal comprising an elongated tubular member having an open end, said tubular member being movable between a first position where said open end is immersed in the molten metal and a second position where said open end is not immersed in the molten metal, means for preventing the molten metal from entering within the tubular member when the latter is in said first position, temperature measuring means including a first thermocouple junction positioned within said member and operative to provide a first control signal in accordance with a first temperature condition of the molten metal when said member is in the first position, and junction forming means positioned within said member and operative with said temperature measuring means when said member is in the second position to make a second thermocouple junction.

7. Apparatus for measuring the temperature of molten metal comprising an elongated tubular member having an open end, said tubular member being movable between a first position where said open end is removed from the molten metal and a second position where said open end is immersed in the molten metal, means for preventing the molten metal from entering within the tubular member when the latter is in said second position, temperature measuring means including temperature responsive device positioned within said member and operative to provide a control signal in accordance with the temperature of the molten metal when said member is in the second position, and temperature responsive device rebuilding means operative with said temperature measuring means when said member is in said first position to rebuild said temperature responsive device.

References Cited
UNITED STATES PATENTS

| | | | |
|---|---|---|---|
| 2,785,216 | 3/1957 | Winner | 73—359 X |
| 2,833,844 | 5/1958 | Burton, et al. | 136—231 |
| 3,080,755 | 3/1963 | Percy | 73—355 |

OTHER REFERENCES

Determination of the Thermal Correction for a Single-Shielded Thermocouple, W. M. Rohsenow et al., Transactions of the A.S.M.E., vol. 69, pages 699–703, August 1947.

DAVID SCHONBERG, *Primary Examiner.*

LOUIS R. PRINCE, *Examiner.*

D. McGIEHAN, N. B. SIEGEL, *Assistant Examiners.*